US006416086B1

(12) United States Patent
Pelletier et al.

(10) Patent No.: US 6,416,086 B1
(45) Date of Patent: Jul. 9, 2002

(54) ARTICULATED ARM FOR TRANSFERRING FLUID PRODUCTS BALANCED BY MEANS OF A SPRING OVER A WIDE RANGE OF MOVEMENT

(75) Inventors: Frederic Pelletier, Paron; Renaud LeDevehat; Cyrille Bex, both of Sens, all of (FR)

(73) Assignee: FMC Corporation, Chicago, IL (US)

(*) Notice: Subject to any disclaimer, the term of this patent is extended or adjusted under 35 U.S.C. 154(b) by 0 days.

(21) Appl. No.: 09/584,309

(22) Filed: May 31, 2000

(30) Foreign Application Priority Data

Jun. 14, 1999 (FR) ........................................ 99 07500

(51) Int. Cl.[7] ........................... F16L 27/00; B67D 5/01
(52) U.S. Cl. .................... 285/184; 285/137.2; 141/387
(58) Field of Search ............................ 285/184, 137.2; 141/387

(56) References Cited

U.S. PATENT DOCUMENTS

| | | | | | |
|---|---|---|---|---|---|
| 628,692 | A | * | 7/1899 | Campbell | 285/184 |
| 2,739,779 | A | * | 3/1956 | Krone | 285/184 |
| 3,086,552 | A | | 4/1963 | Ragsdale | |
| 3,378,033 | A | * | 4/1968 | Cooley, Jr. | 285/184 |
| 3,458,167 | A | * | 7/1969 | Cooley, Jr. | 285/184 |
| 4,111,465 | A | * | 9/1978 | Knight | 285/184 |
| 4,158,462 | A | * | 6/1979 | Coral | 285/184 |
| 4,537,233 | A | | 8/1985 | Vroonland et al. | |
| 5,983,936 | A | * | 11/1999 | Schwieterman et al. | 137/615 |

FOREIGN PATENT DOCUMENTS

| | | |
|---|---|---|
| FR | 2 483 390 | 12/1981 |
| WO | WO 99/64344 | 12/1999 |

* cited by examiner

*Primary Examiner*—Eric K. Nicholson
(74) *Attorney, Agent, or Firm*—Henry C. Query, Jr.

(57) ABSTRACT

The invention proposes an articulated arm for transferring fluid products comprising two tubular sections (7, 8+2) connected to each other by a rotating joint (3) with a horizontal axis, and one of which, mobile in rotation, has an angular reference configuration in which it is balanced despite the effect of gravity. A balancing device (4, 10) compensates for variations in the effect of gravity on this mobile tubular section as a function of the orientation of this vis-a-vis the vertical, it is mounted between a fixed reference portion and a linkage portion of the mobile tubular section which is at a distance other than zero from the axis of rotation; it includes a spring (10) which tends to return the mobile section to its angular reference configuration (it is then idle) and applying to the mobile tubular section a force which is approximately proportional to the distance between this linkage portion and the location of this linkage portion in the angular reference configuration.

10 Claims, 3 Drawing Sheets

ARTICULATED ARM FOR TRANSFERRING FLUID PRODUCTS BALANCED BY MEANS OF A SPRING OVER A WIDE RANGE OF MOVEMENT

The invention relates to the transfer of fluid products, liquid or gaseous, between a base and a mobile reservoir, for example a tank loaded on a lorry or on a railway wagon.

These fluid products can be of highly varied types, for example, but not limited to, petroleum products, such as in particular petrol or liquefied petroleum gas (LPG), or chemical products, in particular acids or solvents.

In practice, these fluid products are mainly liquid, but are generally in equilibrium with a gaseous phase, so that, rather than speaking of liquid products, it is more accurate to speak of fluid products. It may be necessary to transfer these two liquid and gaseous phases separately.

There are in practice various types of tank adapted to be loaded onto various types of support (lorry or wagon). In addition, the tanks are provided with connection flanges, designed to be connected to liquid product transfer pipes, which can be situated in highly diverse ways on the body of these tanks. Finally, in practice it proves to be impossible to guarantee that a mobile support, such as a lorry or wagon, carrying a tank, can always be brought exactly into the same configuration relative to a base, when a transfer operation is necessary.

This is why the connection between the base on the one hand and the connection flange on the mobile reservoir on the other hand can be effected only by means of a device having a certain deformation capability. The fluid product transfer devices, often referred to as transfer arms or loading/unloading arms, are thus of two possible types: either they have a flexible part, which poses possible problems of resistance to aging, or they are constituted by a succession of at least two tubular sections articulated on each other.

Fluid product transfer arms must therefore in practice be brought into a suitable configuration when a transfer operation is being prepared, so as to bring a free end of this arm (the other end generally being connected permanently to the base) opposite the connection flange of the tank concerned. This operation is generally carried out by an operator, and it is desirable for the latter not to be obliged to deploy excessively high forces. It should be stated here that motorized control of a liquid product transfer arm, which avoids any effort for the operators, is however difficult to implement, having regard to the difficulty in bringing the free end of the arm, in an automated fashion, precisely opposite the connection flange; this assumes a high degree of control with regard to the automatic controller controlling the configuration of the arm, and therefore possibly long and expensive training for the operator. In any event, such motorized control entails high costs.

To avoid an operator having to deploy major forces during the manual maneuvering of a liquid product transfer arm, various types of balancing device have already been proposed, designed to compensate at least partly for the variations in torque about the articulation axes (essentially about the horizontal axes due to gravity) generated by the movements of the masses during variations in configuration of the tubular sections of the arm about the axes.

A first category of balancing device uses one or more counterweights which are fixed opposite the part of the arm to be balanced. This solution, entirely effective, nevertheless proves bulky in practice.

Another category of balancing device uses springs, for example steel torsion springs, usually in a cylindrical helix, attached to the rotating joint or inside it. They may also be steel torsion springs in an Archimedes spiral or in a hyperbolic spiral.

Another category of balancing device uses a steel compression spring, often situated along the part of the arm to be balanced or in an appliance referred to as a balancing box or spring box, fixed to the arm part to be balanced.

Yet another category of balancing devices uses steel draw springs also often situated along the arm.

Another configuration of balancing devices uses jacks, for example nitrogen, pneumatic, hydraulic or electric cylinders.

Naturally, these various types of balancing are not mutually exclusive and it has already been proposed to combine several types of balancing on the same transfer arm.

These various solutions have their inherent advantages and disadvantages. It can however, in summary, be stated that at the present time there exists no balancing device which is at the same time effective, compact, reliable and inexpensive, all over a wide range of movement. Thus, for example, the presence of counterweights (see above) provides effective balancing, in a wide variety of possible positions, but at the cost of considerable bulk. With regard to the other solutions, the quality of the balancing is generally entirely approximate, in particular when the transfer arm in question is designed to allow significant movement, in practice on each side of a horizontal idle configuration (there is not always symmetry on either side of this horizontal configuration) and often turns out to lead to risks of faulty operation, having regard to moving parts. Finally, the complete range of movement in which the balancing is satisfactory is generally 40–50° at most.

A subject of the invention is to overcome the aforementioned drawbacks.

To this end it proposes an articulated arm for transferring fluid products, liquid or gaseous, having: two tubular sections connected to each other by a rotating joint with a horizontal axis, and one of which, rotationally mobile about this horizontal axis, has an angular reference configuration in which it is in equilibrium despite the effect of gravity; and a balancing device to compensate for the variations in the gravitational effect on this mobile tubular section as a function of the orientation of this vis-a-vis the vertical, characterized in that this balancing device is mounted between a reference portion fixed relative to the axis of rotation of the rotating joint and a linkage portion of the mobile tubular section which is at a distance other than zero from the axis of rotation and includes a spring which tends to return the mobile section to its angular reference configuration, this spring being designed and mounted so as to apply to the mobile tubular section a force which is approximately proportional to the distance between this linkage portion and the position occupied by this linkage portion when the mobile section is in its angular reference configuration, this spring being in an idle configuration when the mobile section is in a balancing configuration relative to the axis of the rotating joint.

It should be remembered here, that a person skilled in the art usually designed these balancing devices from an intermediate configuration, within the complete range of movement, so as to act upon the spring in both directions, taking advantage of a certain behavioral symmetry of the spring, and thus maximizing the angular amplitude of effectiveness of this spring (a spring generally retains linear characteristics within a limited range about its idle configuration). On the other hand, the invention teaches to choose this reference configuration independently (even from outside) of the range of movement. The result of this is a balancing device which is compact, simple and inexpensive and effective within a quite substantial range. As will be seen, this type of balancing allows good performances, even with significant movements by choosing springs of suitable design.

Preferably, the other section has an orientation which is fixed relative to the axis of the rotating joint (frequently in practice it is the section connected to the fixed base) and the fixed reference portion to which the balancing device is connected by one of its ends is integral with this fixed section. This allows the bulk of the balancing device to be minimized.

Advantageously, the balancing device is connected to this fixed reference portion and the linkage portion of the mobile section by articulations with horizontal axes, which, when the balancing device is not flexible, minimizes the parasitic torque about the rotational axis of the rotating joint.

It is quite particularly useful to provide for the fixed reference portion to be approximately arranged opposite, parallel to the axis of rotation, to the position into which the linkage portion of the mobile tubular section moves, when this is in its reference configuration. This contributes to approaching a very good linearity of the spring as a function of the angular amplitude of the rotation of the section to be balanced. In fact, during the rotation of the tubular section to be balanced, the distance to the axis (lever arm) of the restoring force applied by the spring varies in the same manner as the distance to the axis of the weight.

According to a particularly advantageous embodiment, the balancing device is in the shape of a loop, situated in a plane approximately perpendicular to the axis of rotation and elastically deformable in this plane and has two ends which are, in the idle configuration of this spring, close to one another. This contributes to combining the aforementioned advantage of the good linearity with compactness. In a particularly simple embodiment, the spring comprises: a U-shaped piece forming the spring, elastically flexible in the plane of the loop and having two legs connected by a curved portion; and two fastening lugs extending these legs to the ends of this balancing device.

It should be noted here that the spring advantageously comprises a single loop, for reasons of simplicity, but that, if a greater bulk is allowed parallel to the axis of rotation, springs comprising several loops or turns can be chosen (this can produce a lower stiffness when this is desired).

Good linearity, low parasitic torque and compactness are combined when the balancing device is, at its ends, connected to the fixed reference portion and to the linkage portion of the mobile tubular section, by articulations with axes which are parallel to the axis of rotation of the rotating joint.

The linearity is very good when the ends of the balancing device are opposite, parallel to the axis of rotation of the rotating joint.

Very generally, it is particularly simple to choose a spring which is generally Ushaped, within a balancing device of whatever design. Thus, for example, it can also be a device in which one of the ends of the spring is connected to the linkage portion of the mobile section by a belt passing through a pulley situated, parallel to the axis of rotation, opposite the position in which the linkage portion of the mobile tubular section is found when this is in the reference configuration.

It will be appreciated that in a balancing device according to the invention the spring legs (whether U-shaped or more generally in the shape of one or more loops) are acted upon in a single direction throughout the movement of the mobile section, preferably in the direction corresponding to a coming together (sometimes described as "compression" of the spring with legs).

According to other preferred arrangements of the invention, optionally combined:

- the U-shaped or not U-shaped spring is made from composite material;
- the U-shaped or not U-shaped spring is covered with a silicone sheath.

Aims, characteristics and advantages of the invention will emerge from the following description, given by way of non-limitative example, with reference to the attached drawings in which.

Figure 1:
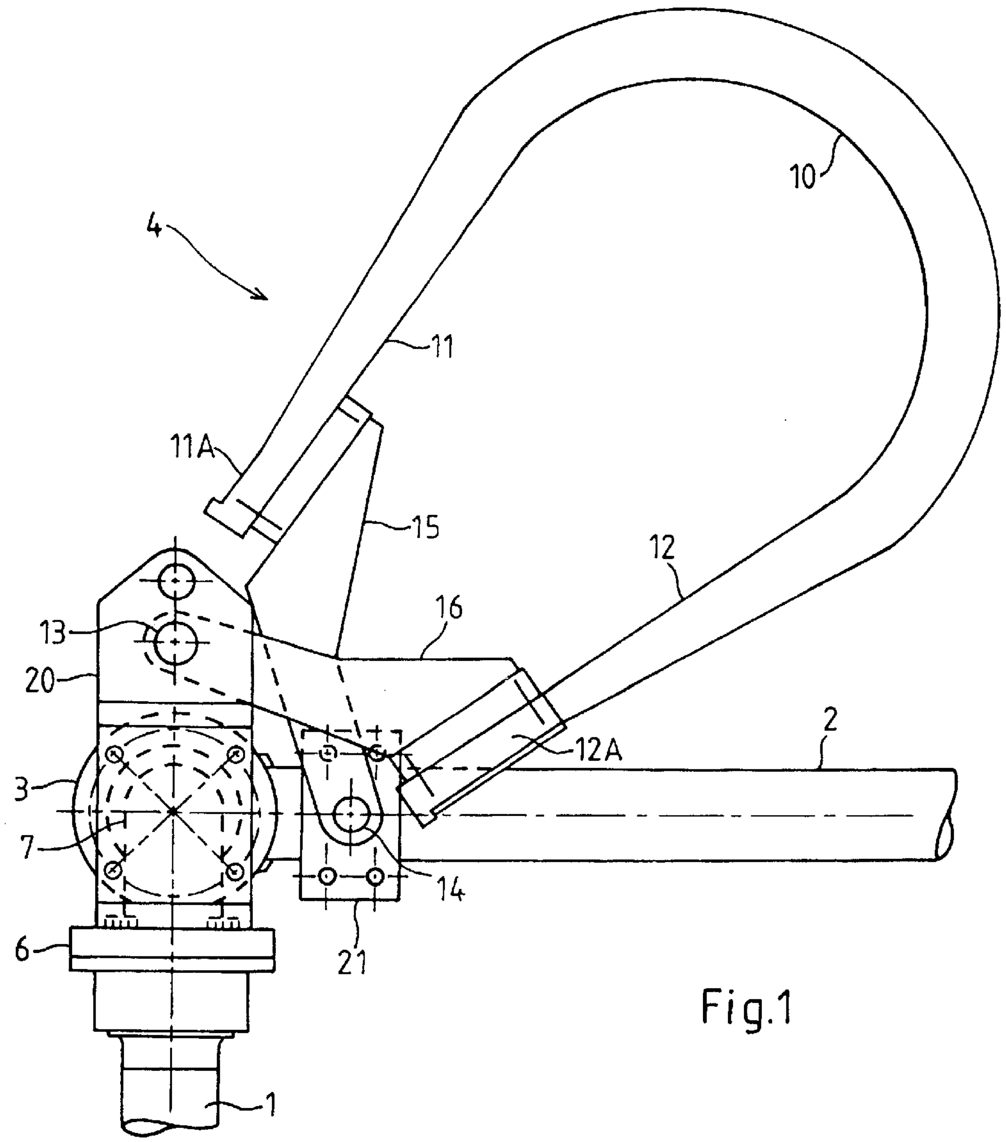
FIG. 1 is an elevation view of a portion of an articulated liquid product transfer arm according to the invention, the section of arm to be balanced being horizontal.
Figure 2:
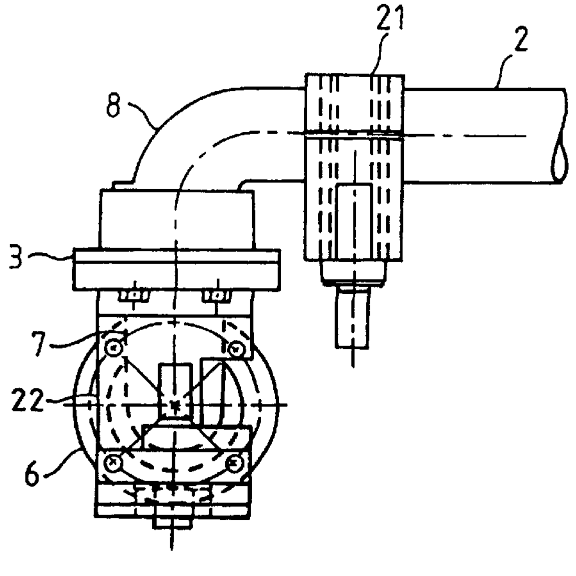
FIG. 2 is a plan view of this articulated liquid product transfer arm, without the spring.
Figure 3:
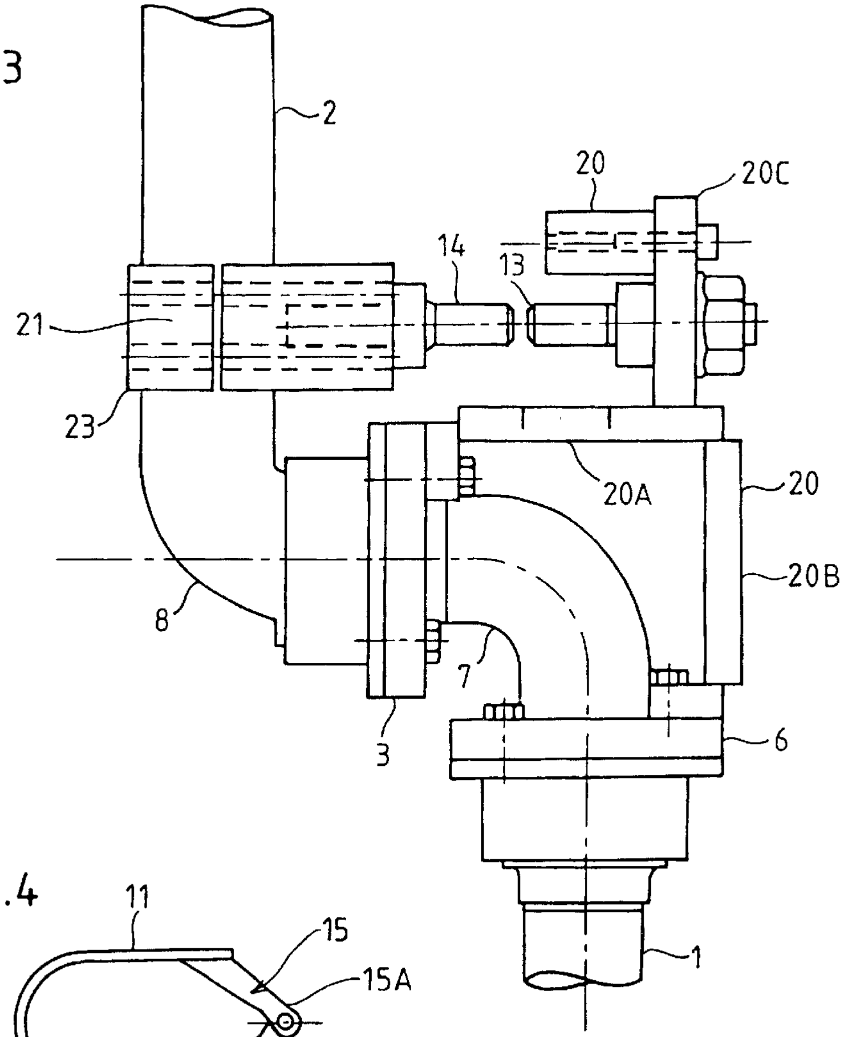
FIG. 3 is a side view of this articulated transfer arm, without the spring, the section of arm to be balanced being in the vertical reference configuration.

FIGS. 1 to 3 partly represent a transfer arm for fluid products, liquid or gaseous, having a first tubular section 1 (in practice fixed, fixed to a base), a second tubular section 2, a rotating joint 3 with a horizontal axis and a balancing device 4 connected to each of the tubular sections in order to compensate for variations in torque (because of gravity) about the axis of the rotating joint during a relative rotation between the sections about this horizontal axis.

In the example represented, the first tubular section 1 is vertical and is connected to a second rotating joint 6 with a vertical axis. This second rotating joint 6 is in its turn connected to the rotating joint 3 with a horizontal axis by means of a right-angle bend 7.

The second tubular section 2 for its part is, in the configuration represented in FIGS. 1 and 2, horizontal. This second tubular section 2 ends at its left hand end in a third 90° bend numbered 8, which is connected to the rotating joint 3.

Thus, according to the angular positions of each of the rotating joints 6 and 3, the second tubular section 2 can adopt any angular orientation (within of course a given range of movement), with regard to both azimuth and elevation, relative to the first tubular section 1.

In fact, it can be noted that the bend 7 which is connected to each of the rotation joints 3 and 6, by itself alone constitutes a tubular section, which is connected to the second tubular section 2 by a rotating joint with a horizontal axis.

The balancing device 4 is connected to each of these tubular sections 2 and 7. Thus, this balancing device is indirectly connected to the tubular section 1 but, insofar as the rotating joint 6 has a vertical axis, no balancing force is necessary to take account of the variations in angular position when this rotating joint rotates.

This balancing device consists essentially of a spring 10, which here is generally U-shaped, having two legs 11 and 12, here parallel to each other in the idle configuration of the spring, the ends 11A and 12A of which are each connected to a respective one of the sections 2 and 7 by fastening lugs 15 and 16.

Advantageously, each of the ends 15A and 16A of these fastening lugs is articulated on its respective section, about an axis parallel to the axis of the rotating joint.

This mounting by articulation of the ends of the spring on the respective sections is effected here by means of a spindles or pins 13 or 14, passing through holes formed in these ends of the fastening lugs.

As can be seen in FIG. 3, when the tubular section 2 to be balanced is in a reference configuration in which it is. naturally balanced, here in a vertical orientation, the pins 13 and 14 are, advantageously, opposite and parallel to the axis of the rotating joint, i.e., are at least approximately in the prolongation of each other.

Figure 4:
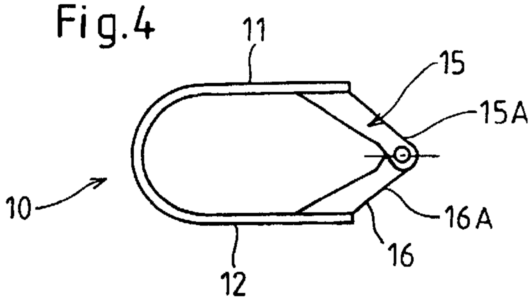
FIG. 4 is an elevation view of the spring in the form of a loop of the balancing device of the arm of FIGS. 1 to 3.

As can be seen in FIG. 4, which represents the spring 10 by itself and therefore idle, the ends 15A and 16A of the fastening lugs in which holes are provided receiving the pins 13 and 14. are arranged close to one another, preferably side by side, so that the holes are concentric.

In a non-represented embodiment, with a view for example to enabling the elastic return produced by a given spring to be controlled according to requirements, the ends of the legs of the spring can have a plurality of holes for receiving an element intended to connect it to the respective tubular section, for example the aforementioned pin 13 or 14.

The fastening lugs 15 and 16 are, in the example in FIG. 4, joined to the ends of the legs of the spring 10, on the inside of these legs. This corresponds to a design of the spring in which the material constituting the legs 11 and 12 and the base portion which connects them may be different from the material constituting the fastening lugs 15 and 16, which are subjected to stresses different from those which are applied to the spring proper, since the spring is required to have good elastic properties and in particular to durably resist aging, and possibly significant climatic fluctuations, whilst the material constituting the lugs 15 and 16 must satisfy constraints relating in particular to good resistance to wear since it is on the internal surface of these holes that all the friction associated with the operation of the balancing device overall will occur.

One and/or the other of the lugs 15 and 16 can be fixed outside the spring.

Figure 5:
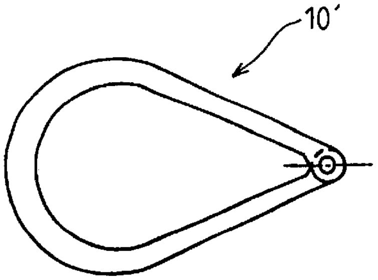
FIG. 5 is a variant embodiment of the item in the form of a loop of FIG. 5.
Figure 6:
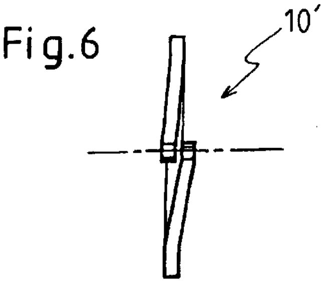
FIG. 6 is a straight-on view of the loop-shaped item of FIG. 5.

As a variant represented in FIGS. 5 and 6, the spring numbered 10 (and therefore the balancing device of which it is the essential element) has the form of a loop, situated in a plane approximately perpendicular to the axis of rotation of the rotating joint. This loop is here formed in a single piece the ends of which are arranged side by side (see FIG. 6).

The two tubular sections 7 and 8+2 connected by the rotating joint with a horizontal axis numbered 3 are each provided, on each side of this rotating joint, with attachment lugs 20 and 21 carrying pins 13 and 14. These are advantageously shaped so that the spring is substantially arranged in a plane perpendicular to the axis of the rotating joint, i.e., in a plane perpendicular to the plane of FIG. 2, or in a plane parallel to the plane of FIG. 1.

As can be seen from the figures, these lugs can thus consist, as regards the lug 20, of two plates 20A and 20B connected at right angles and bearing a plate 20C carrying the pin 13 as well as, advantageously, a stop 22 for the spring or its fastening lugs. As regards the other fastening lug 21, this consists of a collar 23 gripping a portion of the mobile tubular section 2 and carrying the pin 14.

In fact, highly varied methods can be chosen for mounting the U-shaped spring Thus, in a non-represented variant, the lug 20 can be fixed to a portion of the bend 8 situated in immediate proximity to rotating joint 3.

The fact that the two legs of the spring 10 or 10' are preferably substantially in the same plane perpendicular to the axis of rotation of the rotating joint 3 has the advantage of avoiding the appearance, because of the presence of this balancing device, of forces which are not pure torque about the said axis.

The spring is advantageously made from a composite material. This may for example be glass or carbon fibers coated with resin and put in a die (mold) in order to obtain the final U-shape during stoving. The spring, after stoving, passes to the finishing phase, by deflashing, finishing, drilling, fitting of any final silicone sheath (or other depending on availability in the market).

In fact, this spring is advantageously covered with a silicone sheath suitable for effectively protecting the material constituting the U-shaped piece from various external attacks.

It was clear that the use of springs of the aforementioned type, in particular choosing a composite material, made it possible to cover the balancing moments of the arms for transferring liquid products to or from lorries or wagons, within a very wide range from a few daNn to several thousand daNn, or even more. The use of a spring according to the invention therefore permits a substantial improvement of the ergonomics of the work station of an operator loading or unloading lorries or wagons with liquid products. In practice, according to requirements and the characteristics of the springs available in a given range, it is possible to mount several springs in parallel, side by side, in practice using the same articulation axes.

Figure 7:
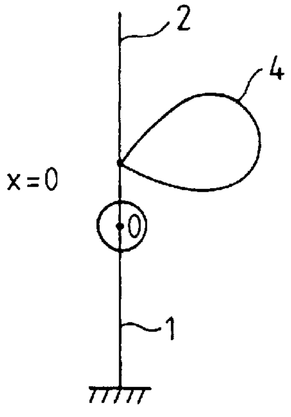
FIG. 7 is a skeleton diagram of the arm of FIGS. 1 to 3 in the configuration where the section of arm to be balanced is vertical.
Figure 8:
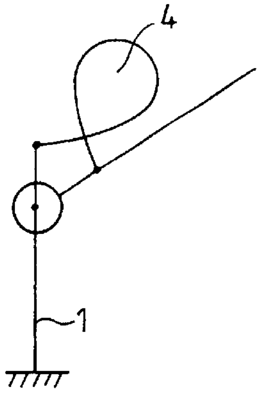
FIG. 8 is a skeleton diagram of this arm, in a configuration where the section to be balanced is inclined slightly upwards.
Figure 9:
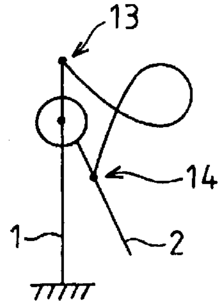
FIG. 9 is another skeleton diagram of this arm, in a configuration where the section of the arm to be balanced is inclined appreciably downwards.

FIGS. 7 to 9 illustrate schematically the balancing principle of a device according to the invention. In the natural balancing configuration (vertical section in FIG. 7) the spring is in the idle configuration, its ends being approximately superposed parallel to the axis of rotation at a distance from it. When the section 2 to be balanced is inclined to the right, the legs of the spring start to cross (the spring is said to compress) and a restoring force is applied by the spring, at a distance from the axis which depends on this inclination; however, it can be shown that variations in this distance are similar to the variations in the distance to the axis of the weight on this section 2. This property is retained over a wide range, up to a configuration inclined towards the low point of the section (see FIG. 9).

Figure 10:
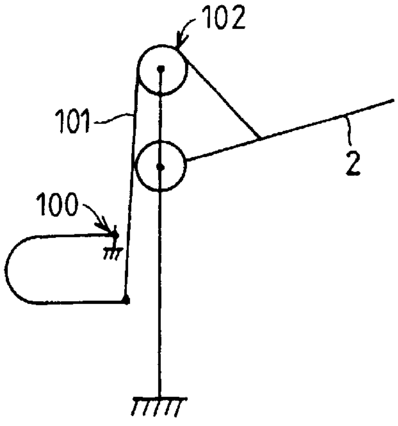
FIG. 10 is a skeleton diagram of a variant embodiment of the invention in which a return by pulley transmits the restoring force of a spring.

It should be noted that the principle which is shown in FIGS. 7 to 9 only requires the spring to be mounted in the configuration of FIG. 1. Thus FIG. 10 shows a configuration having the same properties, but in which the spring 10 (without the fastening lugs) is mounted between a fixed reference portion 100, preferably by articulation, and the end of a belt 101, passing through a pulley 102 and connected by its other end to a point of the section 2 which moves to a position opposite the location of the pulley 102 in the natural balancing configuration of this section.

It should also be noted that, in an effort to simplify matters, the location of the pin 14 on the section is approximately orientated so as to intercept the longitudinal axis of this section, but this location relative to the section is whatever, from the moment that the attachment point of the spring (or the location of the pulley) is opposite this section in the natural balancing configuration.

The invention thus results in a much more effective balancing than the simple assistance afforded by the known devices, whilst being simple, reliable and inexpensive. The balancing obtained is in fact very close to the very high quality balancing achieved by counterweights, of which it was however stated previously that they resulted in a bulk which is a hindrance during operations.

In the drawings, the balancing device proposed by the invention is represented on a large scale. It should however be noted that, relative to an entire liquid product transfer arm, which may include several sections, and only part of which is represented in FIGS. 1 to 3, the invention results in a much lower bulk than in the known solutions.

Through its fixing, the balancing proposed by the invention does not produce any overload on the part to be balanced, compared with a spring box.

It is was shown that the balancing device proposed above allows, within a range of movement of 35° above and 85° below the reference horizontal position, a virtually perfect balancing of the arm (to less than 1 kg in absolute value).

Particularly when a composite material is used to make the spring, the weight of this spring is much less than all the known balancing systems.

From the safely point of view, this spring cannot break when the arm falls under its own weight, as has been found during tests, even when adding high overloads to the arm; this spring may deteriorate but not to the point of allowing the load to drop abruptly. If appropriate, stops can be provided for limiting the coming together (or moving apart) of the legs of the spring.

It may be noted that throughout the movement, the spring is acted upon in a single direction (compression). Of course in a non-represented variant it may be acted upon only by traction.

The fixing of the proposed device is simple to implement and requires no special tool.

The device described above has proved not very sensitive to normal variations in climatic temperature. It is also, through its design (in particular because of the composite nature of the U-shaped piece), not very sensitive to ultraviolet radiation. No protective paint is therefore necessary.

Because of its simplicity of design, the balancing device of the invention very substantially reduces the need for spare parts.

It may be noted that this assembly can be used with several springs mounted in parallel, thus allowing a greater balancing moment to be obtained.

What is claimed is:

1. An articulated arm for transferring fluid products, liquid or gaseous, comprising:

two tubular sections connected to each other by a rotating joint having a horizontal axis, one of said tubular sections being rotationally mobile about the horizontal axis and having an angular reference configuration in which it is balanced despite the effect of gravity, this mobile tubular section comprising a linkage portion which is at a constant distance other than zero from the horizontal axis and which has a reference position defined as the position of this linkage portion when the mobile tubular section is in its angular reference configuration;

a reference portion fixed relative to the horizontal axis of the rotating joint; and a balancing device to compensate for the variations in the effect of gravity on the mobile tubular section as a function of its orientation with respect to the angular reference configuration, the balancing device being mounted between the reference portion and the linkage portion and comprising a spring designed and mounted so as to apply at least indirectly to the mobile tubular section a force which is approximately proportional to the distance between an instant position of the linkage portion and the reference position of the linkage portion and which is substantially parallel to a line joining the instant and reference positions, the spring being in an inactive configuration when the mobile tubular section is in the angular reference configuration.

2. Arm according to claim 1, characterized in that the other section is of fixed orientation relative to the axis of the rotating joint, and the fixed reference portion to which the balancing device is connected by one of its ends is integral with this fixed section.

3. Arm according to claim 2, characterized in that the balancing device is connected to this fixed reference portion and to the linkage portion of the mobile section by articulations with horizontal axes.

4. Arm according to claim 3, characterized in that the fixed reference portion is approximately arranged opposite, parallel to the axis of rotation, the position into which the linkage portion of the mobile tubular section moves, when this is in its reference configuration.

5. An articulated arm for transferring fluid products, liquid or gaseous, comprising:

two tubular sections connected to each other by a rotating joint having a horizontal axis, one of said tubular sections being rotationally mobile about the horizontal axis and having an angular reference configuration In which it is balanced despite the effect of gravity, this mobile tubular section comprising a linkage portion which is at a constant distance other than zero from the horizontal axis and which has a reference position defined as the position of this linkage portion when the mobile tubular section is in its angular reference configuration;

a reference portion fixed relative to the horizontal axis of the rotating joint; and a balancing device to compensate for the variations in the effect of gravity on the mobile tubular section as a function of its orientation with respect to the angular reference configuration, the balancing device being mounted between the reference portion and the linkage portion and comprising a spring designed and mounted so as to apply at least indirectly to the mobile tubular section a force which is approximately proportional to the distance between an instant position of the linkage portion and the reference position of the linkage portion and which is substantially parallel to a line joining the instant and reference positions, the spring being in an inactive configuration when the mobile tubular section is in the angular reference configuration;

wherein the balancing device has the form of a loop which is situated in a plane approximately perpendicular to the axis of rotation, is elastically flexible in this plane and has two ends which are, in the inactive configuration of the spring, close to one another.

6. Arm according to claim 5, characterized in that the spring comprises:

a U-shaped piece forming the spring, elastically flexible in the plane of the loop and having two legs connected by a curved portion; and two fastening lugs extending these legs to the ends of this balancing device.

7. Arm according to claim 6, characterized in that the balancing device is, at its ends, connected to the fixed reference portion and to the linkage portion of the mobile tubular section, by articulations with axes parallel to the axis of rotation of the rotating joint.

8. Arm according to claim 7, characterized in that the ends of the balancing device are opposite, parallel to the axis of rotation of the rotating joint.

9. An articulated arm for transferring fluid products, liquid or gaseous, comprising:

two tubular sections connected to each other by a rotating joint having a horizontal axis, one of said tubular sections being rotationally mobile about the horizontal axis and having an angular reference configuration in which it is balanced despite the effect of gravity, this mobile tubular section comprising a linkage portion which is at a constant distance other than zero from the horizontal axis and which has a reference position defined as the position of this linkage portion when the mobile tubular section is in its angular reference configuration;

a reference portion fixed relative to the horizontal axis of the rotating joint; and a balancing device to compensate for the variations in the effect of gravity on the mobile tubular section as a function of its orientation with respect to the angular reference configuration, the balancing device being mounted between the reference portion and the linkage portion and comprising a spring designed and mounted so as to apply at least indirectly to the mobile tubular section a force which is approximately proportional to the distance between an instant position of the linkage portion and the reference position of the linkage portion and which is substantially parallel to a line joining the instant and reference positions, the spring being in an inactive configuration when the mobile tubular section is in the angular reference configuration;

wherein the spring is generally U-shaped.

10. Arm according to claim 9, characterized in that one of the ends of the spring is connected to the linkage portion of the mobile section by a belt passing through a pulley situated, parallel to the axis of rotation, opposite the position in which the linkage portion of the mobile tubular section is found when this is in the reference configuration.

* * * * *